(12) United States Patent
Stewart et al.

(10) Patent No.: US 7,808,998 B2
(45) Date of Patent: Oct. 5, 2010

(54) DISCONNECTED TRANSPORT PROTOCOL CONNECTIVITY

(75) Inventors: Randall Stewart, Chapin, SC (US); Gopal Dommety, San Jose, CA (US); Anantha Ramaiah, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 12/024,031

(22) Filed: Jan. 31, 2008

(65) Prior Publication Data

US 2009/0196178 A1  Aug. 6, 2009

(51) Int. Cl.
*H04L 12/28* (2006.01)
*H04J 3/06* (2006.01)

(52) U.S. Cl. ...................... 370/394; 370/503
(58) Field of Classification Search .................. 370/394
See application file for complete search history.

(56) References Cited

U.S. PATENT DOCUMENTS

| 7,293,107 | B1 | 11/2007 | Hanson et al. | 709/245 |
| 2006/0193276 | A1* | 8/2006 | Sakata | 370/310 |
| 2007/0245003 | A1* | 10/2007 | Kashyap | 709/223 |
| 2008/0144508 | A1* | 6/2008 | Tseng | 370/235 |

OTHER PUBLICATIONS

Dawson, Scott et al., Experiments on Six Commercial TCP Implementations Using a Software Fault Injection Tool, Dec. 1997, pp. 1-26, John Wiley & Sons, Ltd., http://hdl.handle.net/2027.42/34550.
Technical Overview of NetMotion Mobility XE, 2007, pp. 1-16, NetMotion Wireless, Seattle, WA, www.hako24.de/netmotion.
Zeng, Wan G. et al., Improving TCP Performance with Periodic Disconnections Over Wireless Links, prior to 2008, pp. 1-7, Simon Frasier University, B.C., Canada, www.ensc.sfu.ca.

* cited by examiner

*Primary Examiner*—Chirag G Shah
*Assistant Examiner*—Nima Mahmoudzadeh
(74) *Attorney, Agent, or Firm*—Brinks Hofer Gilson & Lione

(57) ABSTRACT

In an embodiment, an existing transport protocol connection though a mobile device is recognized as having entered a state of disconnect. A lowest received sequence number is determined from received messages to be transmitted over a disconnected transport protocol connection. A disconnect acknowledgement message with a receive window of zero and a sequence number of one less than the lowest received sequence number is transmitted. The disconnect acknowledge message with a receive window of zero and a sequence number of one less than the lowest received sequence number is continued to be transmitted until the transport protocol connection exits the disconnect state to a connect state.

20 Claims, 7 Drawing Sheets

301 RECOGNIZE AN EXISTING TRANSPORT PROTOCOL CONNECTION THOUGH THE MOBILE DEVICE HAS ENTERED A STATE OF DISCONNECT

302 DETERMINE A LOWEST RECEIVED SEQUENCE NUMBER FROM RECEIVED MESSAGES TO BE TRANSMITTED OVER THE DISCONNECTED TRANSPORT PROTOCOL CONNECTION

305 RECEIVE A FIRST MESSAGE TO BE TRANSMITTED OVER THE EXISTING CONNECTION, THE FIRST MESSAGE INCLUDING A RECEIVED SEQUENCE NUMBER

306 RECEIVE A SECOND MESSAGE TO BE TRANSMITTED OVER THE CONNECTION, THE SECOND MESSAGE INCLUDING THE SAME RECEIVED SEQUENCE NUMBER, THE RECEIVED SEQUENCE NUMBER BEING THE LOWEST RECEIVED SEQUENCE NUMBER

308 RECEIVING A SECOND MESSAGE TO BE TRANSMITTED OVER THE CONNECTION, THE SECOND MESSAGE BEING EQUIVALENT TO THE FIRST MESSAGE, SUCH THAT THE SECOND MESSAGE INCLUDES THE SAME RECEIVED SEQUENCE NUMBER AND THE SAME DATA AS THE FIRST MESSAGE

307 PRIOR TO RECEIVING THE SECOND MESSAGE, FAIL TO RESPOND TO THE RECEIVED FIRST MESSAGE WITH AN ACKNOWLEDGEMENT MESSAGE

303 TRANSMIT A DISCONNECT ACKNOWLEDGEMENT MESSAGE WITH A RECEIVE WINDOW OF ZERO AND A SEQUENCE NUMBER OF ONE LESS THAN THE LOWEST RECEIVED SEQUENCE NUMBER

304 CONTINUE TO TRANSMIT THE DISCONNECT ACKNOWLEDGE MESSAGE WITH A RECEIVE WINDOW OF ZERO AND A SEQUENCE NUMBER OF ONE LESS THAN THE LOWEST RECEIVED SEQUENCE NUMBER UNTIL THE TRANSPORT PROTOCOL CONNECTION EXITS THE DISCONNECT STATE TO A CONNECT STATE

FIG. 3

401 RECOGNIZE AN EXISTING TRANSPORT PROTOCOL CONNECTION THOUGH THE MOBILE DEVICE HAS ENTERED A STATE OF DISCONNECT

407 TRACK A CURRENT LOWEST SEQUENCE NUMBER RECEIVED IN A SERIES OF MESSAGES TO BE TRANSMITTED OVER THE CONNECTION

410 PRIOR TO RECOGNIZING THAT A CONNECTION HAS ENTERED A STATE OF DISCONNECT, TRACK CONNECTION STATE DATA FOR A TRANSPORT PROTOCOL CONNECTION THROUGH THE MOBILE DEVICE, CONNECTION STATE DATA INCLUDING A SEQUENCE NUMBER AND AN IDENTIFIER OF EACH MESSAGE TO BE TRANSMITTED OVER THE CONNECTION

402 DETERMINE A LOWEST RECEIVED SEQUENCE NUMBER FROM RECEIVED MESSAGES TO BE TRANSMITTED OVER THE DISCONNECTED TRANSPORT PROTOCOL CONNECTION

403 TRANSMIT A DISCONNECT ACKNOWLEDGEMENT MESSAGE WITH A RECEIVE WINDOW OF ZERO AND A SEQUENCE NUMBER OF ONE LESS THAN THE LOWEST RECEIVED SEQUENCE NUMBER

408 TRANSMIT A DISCONNECT ACKNOWLEDGEMENT MESSAGE WITH A RECEIVE WINDOW OF ZERO AND A SEQUENCE NUMBER OF ONE LESS THAN THE CURRENT LOWEST SEQUENCE NUMBER RECEIVED

404 CONTINUE TO TRANSMIT THE DISCONNECT ACKNOWLEDGE MESSAGE WITH A RECEIVE WINDOW OF ZERO AND A SEQUENCE NUMBER OF ONE LESS THAN THE LOWEST RECEIVED SEQUENCE NUMBER UNTIL THE TRANSPORT PROTOCOL CONNECTION EXITS THE DISCONNECT STATE TO A CONNECT STATE

409 CONTINUE TO TRANSMIT THE DISCONNECT ACKNOWLEDGE MESSAGE WITH A RECEIVE WINDOW OF ZERO AND A SEQUENCE NUMBER OF ONE LESS THAN THE CURRENT LOWEST SEQUENCE NUMBER RECEIVED UNTIL THE TRANSPORT PROTOCOL CONNECTION EXITS THE DISCONNECT STATE TO A CONNECT STATE

FIG. 4B

DISCONNECTED TRANSPORT PROTOCOL CONNECTIVITY

TECHNICAL FIELD

The present disclosures relates generally to transport protocols used over mobile networks.

BACKGROUND

Mobile networks pose new problems for users of transport protocols. Oftentimes when a network is a mobile network, the mobile router may lose all connectivity (that is, disconnect) with a mobile device for a short period of time. During such a period of time, transport protocol connections (such as TCP connections) that are up between the device and the router may fail due to the disconnection.

OVERVIEW

In an embodiment there is provided a method. The method includes recognizing an existing transport protocol connection though a mobile device has entered a state of disconnect, and determining a lowest received sequence number from received messages to be transmitted over the disconnected transport protocol connection. The method also includes transmitting a disconnect acknowledgement message with a receive window of zero and a sequence number of one less than the lowest received sequence number; and continuing to transmit the disconnect acknowledge message with a receive window of zero and a sequence number of one less than the lowest received sequence number until the transport protocol connection exits the disconnect state to a connect state.

Arrangements involving a computer program product are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments. Software processes that operate in a collection of computerized devices, such as in a group of data communications devices or other entities may also provide the system. The system may be distributed between many software processes on several data communications devices, or all processes could run on a small set of dedicated computers or on one computer alone. It is to be understood that embodiments may be embodied strictly as a software program, as software and hardware, or as hardware and/or circuitry alone, such as within a data communications device. The features as explained herein may be employed in data communications devices and/or software systems for such devices such as those manufactured by Cisco Systems, Inc. of San Jose, Calif.

BRIEF DESCRIPTION OF THE DRAWINGS

The foregoing will be apparent from the following more particular description of preferred embodiments, as illustrated in the accompanying drawings in which like reference characters refer to the same parts throughout the different views. The drawings are not necessarily to scale, emphasis instead being placed upon illustrating the principles described herein.

FIG. 3 illustrates a flowchart of a procedure preformed by the computer system depicted in FIG. 1 when the disconnect state maintenance process determines the lowest sequence number by waiting for a re-transmission of a message.

FIGS. 4A-4B illustrate a flowchart of a procedure preformed by the computer system depicted in FIG. 1 when the disconnection state maintenance process also tracks transport protocol connection state data.

DESCRIPTION OF EXAMPLE EMBODIMENTS

Figure 1:
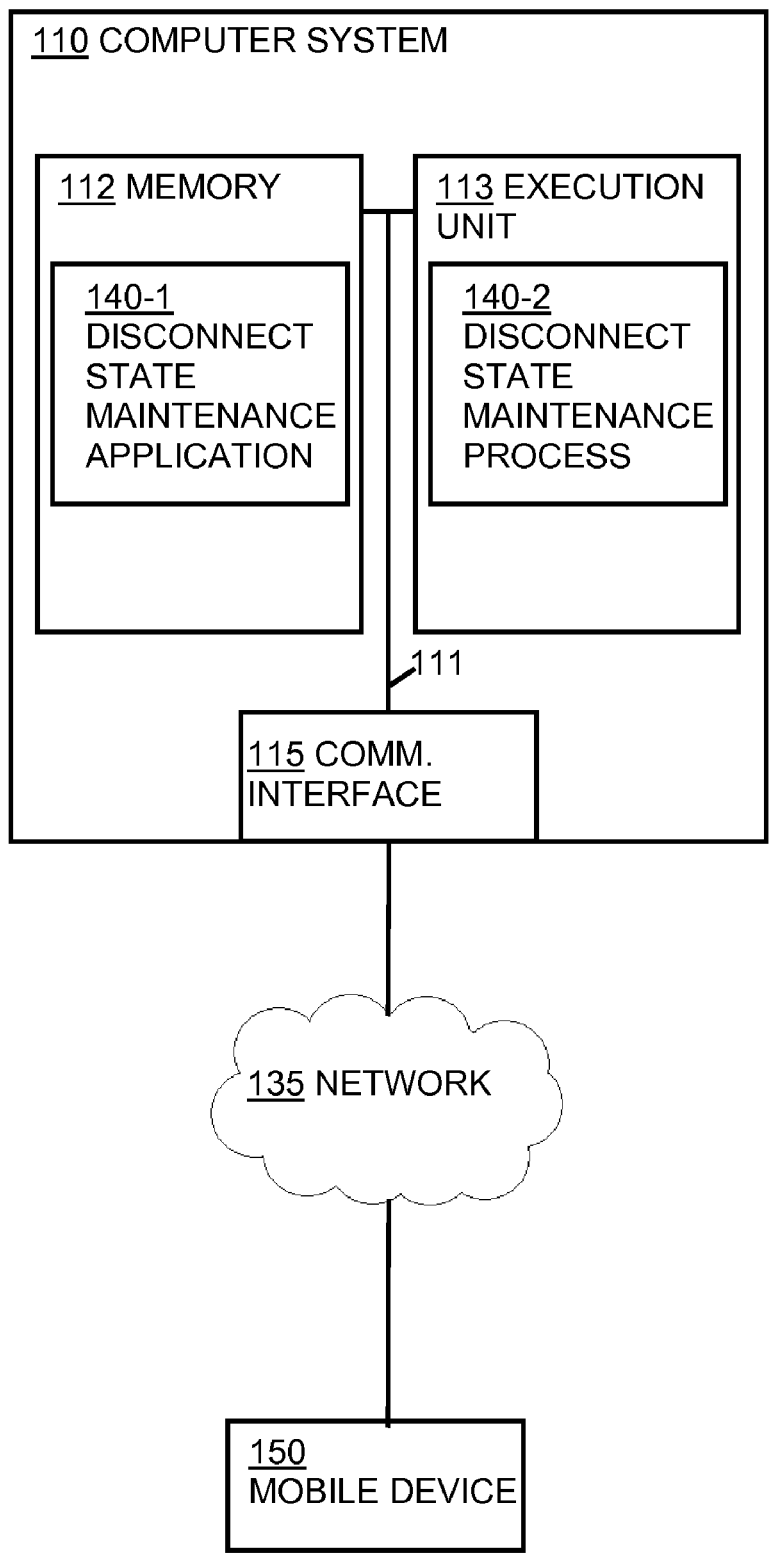
FIG. 1 illustrates an example computer system architecture for a computer system according to one embodiment disclosed herein.

Conventional mobile routers address transport protocol disconnections by continuously tracking the connection state data for each connection through the mobile router, whether the connection is active or not (i.e., disconnected). One issue with this conventional approach is that, typically, mobile routers are small devices; that is, a mobile router is small in physical size, so it includes a limited amount of processing and memory resources. It is possible to increase those resources, but not without similarly increasing the physical size of the mobile router. Such an increase may be necessary because, at any one time, a mobile router may have hundreds or even thousands of hosts or other similar devices connected through it. Even if only a few of those devices have active transport protocol connections at any one time, all of them will have active transport protocol connections at some time. Therefore, the mobile router would need to include enough memory and processing resources to theoretically track connection state data for most of, if not all of, those devices. It may thus be hard to design a mobile router in such a way that it would be able to maintain the large amounts of state information or data on every transport protocol connection proceeding through the mobile router, due to the necessary increase in the physical size of the router. Embodiments overcome this issue by having the transport protocol connection state data be tracked only during times when the transport protocol connection is in a state of disconnect. The mobile router is thus able to recognize when a disconnect state occurs. That is, the mobile router is able to tell when an existing transport protocol connection enters a period of disconnect. For example, the mobile device to which the mobile router is connected via the transport protocol connection may have moved out of range of the mobile router. In such a situation, the mobile router desires to preserve the transport protocol connection in case, for example, the disconnect state is temporary. In other words, if the mobile device is only out of range of the mobile router for two seconds, which is a long enough period of time for the transport protocol connection to enter a state of disconnect, it is undesirable for the mobile router to simply drop the connection state altogether for such a short interruption, as the mobile device would then lose whatever data it was transmitting or receiving, and would have to re-start the transmission or reception. Instead, during the disconnect state, the mobile router figures out the lowest sequence number of a message to be transmitted over the currently disconnection transport protocol connection. For example, after the mobile router detects a disconnect state, a host (or other device) connected to the mobile router that used the disconnected transport protocol connection to transmit messages transmits a message. The message includes a sequence number, that is, an identifier of what part of the total data being transmitted this message contains. The sequence number may be 100. The mobile router wants to know if that is the lowest sequence number that was transmitted by that host over the now-disconnected transport protocol connection. In one embodiment, the mobile router determines what the lowest sequence is by waiting for the host to re-transmit the message. As long as the next received message includes the same sequence number (that is, 100 in the example), the mobile router knows it has the lowest sequence number. Then, the mobile router responds to that message with an acknowledgement message including a sequence number of the lowest sequence number minus one, and a receive window of zero. When the host receives that message, it will force the host into a persist state; that is, the host will continually try to re-transmit the message. As long as the mobile router continues to respond to each re-transmitted with an acknowledgement message with a sequence number of the lowest sequence number minus one, and a receive window of zero lowest, the host will remain in the persist state. That is, the host will continually try to probe the mobile router to see if the mobile router will accept its next message (the one with the lowest sequence number), which may be signaled to the host by changing the size of the receive window to a value greater than zero. The mobile router, however, waits to do this until the transport protocol connection is no longer disconnected. Thus, when the transport protocol connection resumes, normal communications resume over the connection. The mobile router may, for example, respond to a probing message from the host in persist state with an acknowledgement message including a receive window of something greater than zero, at which point the host will exit persist state and resuming transmitting the messages from where it left off. Transport protocol connections are thus maintained, even though a disconnect occurs between the mobile router and the mobile device. Further, no transport protocol connection state data or information is or needs be tracked until a disconnect occurs. Even when a disconnect occurs, only the state data of active connections needs to be tracked. Note that, while embodiments as described herein include operations performed by a mobile router, the same operations may also be performed by a different mobile device, such as but not limited to a home agent, that connects to a mobile router via a mobile connection.

Generally, disclosed embodiments allow a mobile router or other mobile device (such as a home agent) that has an existing transport protocol connection to maintain state data for that connection during times of disconnect without continuously tracking the state data prior to (and/or following) times of disconnect. Thus, a mobile router or a home agent holds no transport protocol connection state data or information until a disconnection occurs. The mobile router/home agent is configured to recognize a disconnect state. Then, the mobile router/home agent tracks transport protocol connection state data by first determining current state data, particularly, the lowest sequence number. This number is used by the mobile router/home agent to send an acknowledgement message include a zero receive window (and a sequence number of one minus the lowest sequence number). Such an acknowledge message forces the recipient into a persist state/window probing state, until the disconnect ends.

Note that throughout the application, a transport protocol may include any type of known transport protocol, such as but not limited to Transmission Control Protocol (TCP), Stream Control Transmission Protocol (SCTP), and so on. Of course, depending on the type of transport protocol used by the mobile router/home agent, one of ordinary skill in the art may need to modify embodiments described herein. For example, when a mobile router/home agent uses TCP, embodiments would look for and use the lowest TCP sequence number. Alternatively, when a mobile router/home agent uses SCTP, embodiments would look for and use the lowest SCTP TSN (Transport Sequence Number) and it would need to maintain on a longer term basis verification tags (V-Tags) for each existing connection. Other such modifications may be made to any described embodiment without departing from the scope of the disclosure.

More particularly, FIG. 1 is a block diagram illustrating an example architecture of a computer system 110 that executes, runs, interprets, operates or otherwise performs an disconnect state maintenance application 140-1 and a disconnect state maintenance process 140-2 suitable for use in explaining example configurations disclosed herein. As shown in this example, the computer system 110 includes an interconnection mechanism 111 such as a data bus or other circuitry that couples a memory system 112, an execution unit 113, and at least one communications interface 115. The communications interface 115 enables the computer system 110 to communicate with other devices, such as but not limited to other computer systems (such as routers) (not shown) and devices, such as mobile device 150, over a network 135. The connections between the computer system 110 and any other device through the network 135 may be, but need not be, wireless (that is, mobile) connections.

The memory system 112 is any type of computer readable medium and in this example is encoded with a disconnect state maintenance application 140-1 that includes disconnect state maintenance process 140-2. The disconnect state maintenance application 140-1 may be embodied as software code such as data and/or logic instructions (e.g., code stored in the memory system 112 or on another computer readable medium such as a removable disk) that supports processing functionality according to different embodiments described herein. During operation of the computer system 110, the execution unit 113 accesses the memory system 112 via the interconnection mechanism 111 in order to launch, run, execute, interpret or otherwise perform the logic instructions of the disconnect state maintenance application 140-1. Execution of the disconnect state maintenance application 140-1 in this manner produces processing functionality in a disconnect state maintenance process 140-2. In other words, the disconnect state maintenance process 140-2 represents one or more portions or runtime instances of the disconnect state maintenance application 140-1 performing or executing within or upon the execution unit 113 in the computer system 110 at runtime.

It is noted that example configurations disclosed herein include the disconnect state maintenance application 140-1 itself including the disconnect state maintenance process 140-2 (i.e., in the form of un-executed or non-performing logic instructions and/or data). The disconnect state maintenance application 140-1 may be stored on a computer readable medium (such as a floppy disk), hard disk, electronic, magnetic, optical or other computer readable medium. The disconnect state maintenance application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the disconnect state maintenance application 140-1 in the execution unit 113 as the disconnect state maintenance process 140-2. Those skilled in the art will understand that the computer system 110 may include other processes and/or software and hardware components, such as an operating system not shown in this example.

A number of flowcharts of the presently disclosed method are illustrated in FIGS. 2-6. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required according to embodiments disclosed herein. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied. Thus, unless otherwise stated, the steps described below are unordered, meaning that, when possible, the steps may be performed in any convenient or desirable order.

Figure 2:
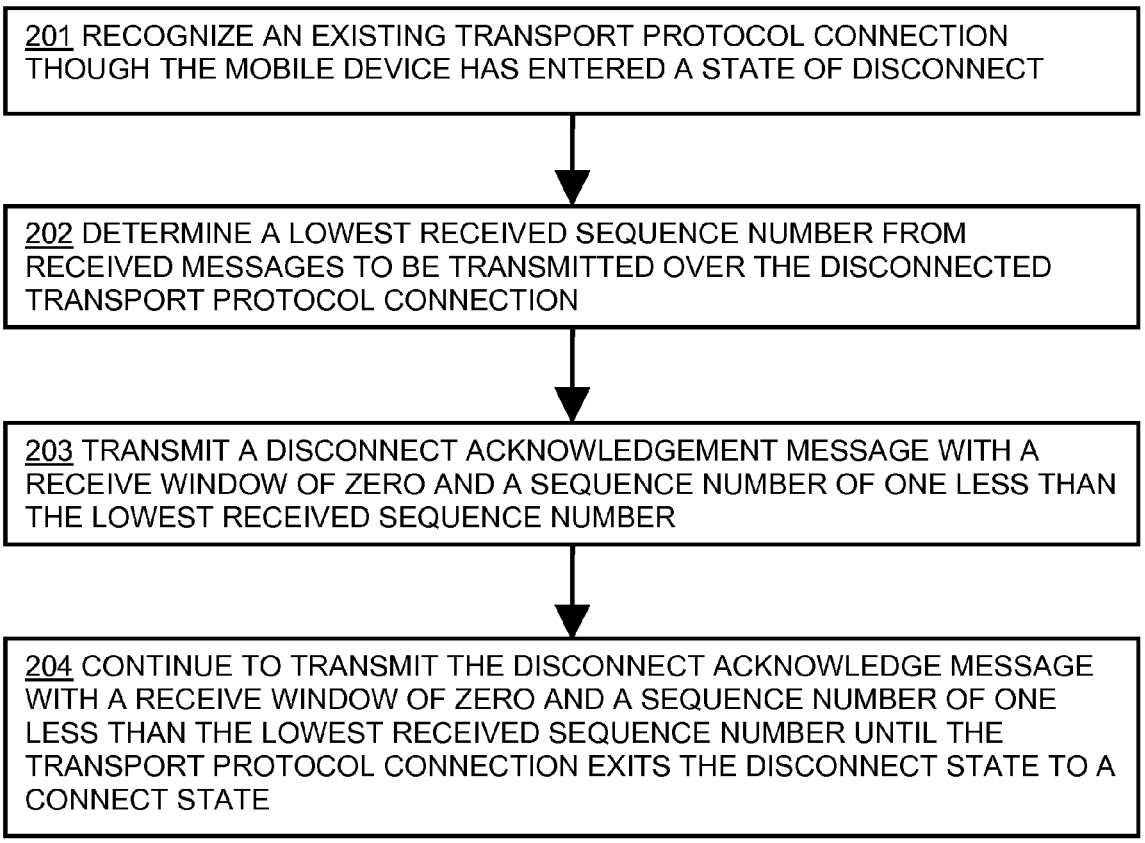
FIG. 2 illustrates a flowchart of a procedure performed by the computer system depicted in FIG. 1 when executing a disconnect state maintenance process according to an embodiment described herein.

More specifically, FIGS. 2-6 illustrate flowcharts of a various embodiments of the disconnect state maintenance application 140-1 executing in the execution unit of the computer system 110 as the disconnect state maintenance process 140-2. In FIG. 2, the disconnect state maintenance process 140-2 (which may be located on either end, or both ends, of a mobile router-mobile device connection) maintains transport protocol connection state data in a mobile device. The disconnect state maintenance process 140-2 recognizes that an existing transport protocol connection though the mobile device has entered a state of disconnect, step 201. The disconnect state maintenance process 140-2 may recognize the disconnect state of the connection in any number of ways. For example, the disconnect state maintenance process 140-2 may continuously transmit a message, such as a ping or a similar message, to a device the computer system is connected to via the connection. If the message is unable to be transmitted, the disconnect state maintenance process 140-2 may know that the connection is in a disconnect state. Similarly, the disconnect state maintenance process 140-2 may be configured to continually receive such messages from the device the computer system is connected to via the connection. If the computer system stops receiving such messages, the disconnect state maintenance process 140-2 may know that the connection is in a disconnect state. Alternatively, if the computer system is a mobile device and the connection is via a wireless signal to a mobile router, when the computer system is no long able to detect a signal from the mobile router, the disconnect state maintenance process 140-2 may know that the connection is in a disconnect state. Of course, the disconnect state maintenance process 140-2 may use any of these processes or any other appropriate way of recognizing that a transport protocol connection is in a state of disconnect.

The disconnect state maintenance process 140-2 next determines a lowest received sequence number from received messages to be transmitted over the disconnected transport protocol connection, step 202. The disconnect state maintenance process 140-2 may determine the lowest received sequence number in a variety of ways, some of which are described further below in connection with FIGS. 3, 4A, and 4B. In some embodiments, the disconnect state maintenance process 140-2 must be absolutely sure of the lowest sequence number prior to performing any other actions or operations that require knowledge of the lowest sequence number. Failure to do so could result in the disconnect state maintenance process 140-2 failing to maintain connection state data for the transport protocol in a state of disconnect.

After determining the lowest received sequence number, the disconnect state maintenance process 140-2 transmits a disconnect acknowledgement message, step 203. The disconnect acknowledgement message includes a receive window of zero. In other words, the disconnect state maintenance process 140-2 is essentially informing the recipient of the disconnect acknowledgement message that the computer system 110 is currently unable to accept any more data, but to try to retransmit the data later. This forces the recipient of the disconnect acknowledgement message to continually probe the computer system 110, which leads to the transmission of further disconnect acknowledgement messages, as is explained below.

The disconnect acknowledgement message also includes a sequence number of one less than the lowest received sequence number. This is how the disconnect state maintenance process 140-2 gets the recipient of the disconnect acknowledgement message to continue to try to retransmit the next message according to sequence number. For example, say the disconnect state maintenance process 140-2 recognized a disconnect state, and determined that the lowest sequence number was ten. A host trying to transmit messages through the computer system 110 via the disconnected transport protocol connection is thus trying to send a message with the sequence number of ten. The disconnect state maintenance process 140-2 wants the host to keep trying to send this message, so that when the disconnect state ends, the proper message may be transmitted over the transport protocol connection. To do this, the disconnect state maintenance process 140-2 transmits a disconnect acknowledgement message with a sequence number of nine (that is, one less than the lowest sequence number). The host that receives the disconnect acknowledge message will respond to the disconnect acknowledgement message by transmitting the next message by sequence number, i.e., the message with a sequence number of ten.

Finally, the disconnect state maintenance process 140-2 continues to transmit the disconnect acknowledge message with a receive window of zero and a sequence number of one less than the lowest received sequence number until the transport protocol connection exits the disconnect state to a connect state, step 204. Thus, for every time a host tries to probe the computer system 110, the disconnect state maintenance process 140-2 will respond with a disconnect acknowledgement message that forces the host to continue to probe the computer system 110, and to try to re-send the next proper message in sequence. The disconnect state maintenance process 140-2 and the host continue this back and forth communication until the transport protocol connection is no longer in a disconnect state, but is rather back in a connect state. How the disconnect state maintenance process 140-2 may determine that the disconnect state is over is described in greater detail below with regards to FIG. 6.

FIG. 3 illustrates embodiments of how the disconnect state maintenance process 140-2 may determine what the lowest sequence number for a series of messages is. The disconnect state maintenance process 140-2 first recognizes that an existing transport protocol connection though the mobile device has entered a state of disconnect, step 301. As stated above, the disconnect state maintenance process 140-2 may use any number of ways to perform this operation. The disconnect state maintenance process 140-2 next determines a lowest received sequence number from received messages to be transmitted over the disconnected transport protocol connection, step 302.

Here, the disconnect state maintenance process 140-2 receives a first message to be transmitted over the existing connection, step 305. The first message includes a received sequence number. This received sequence number may or may not be the lowest sequence number. For example, say the first message contained four bytes of data, and the sequence number was one hundred, but this value was corrupted during transmission to the computer system 110, so that the disconnect state maintenance process 140-2 noted a received sequence number of 101. This would not be the correct sequence number, but as of this point in time, the disconnect state maintenance process 140-2 has no way of knowing 101 is not the correct sequence number.

The disconnect state maintenance process 140-2 is thus programmed to wait until it receives a second message to be transmitted over the connection, the second message including the same received sequence number, step 306. In the example provided above, it is unlikely that same corruption occurs a second time, so the disconnect state maintenance process 140-2 should next receive a message with a sequence number of 100. Noting the discrepancy in the numbers, the disconnect state maintenance process 140-2 would then wait for another message. If the another message included a sequence number of 100, the disconnect state maintenance process 140-2 would treat this message as the received second message, because it has the same sequence number as the message received before it. The disconnect state maintenance process 140-2 would then know that the received sequence number (100) is the lowest received sequence number of the different sequence numbers received (100 and 101). Note that an error may occur not with the first message sent, but rather the second, such that the disconnect state maintenance process 140-2 may receive this sequence of sequence numbers: 100; 101; 100. Here, the disconnect state maintenance process 140-2 would wait to receive the next message, and if that message had a sequence number of 100, the disconnect state maintenance process 140-2 would take 100 to be the lowest sequence number. Alternatively, if when the disconnect state maintenance process 140-2 receives a second message to be transmitted over the connection, the second message being equivalent to the first message, such that the second message includes the same received sequence number and the same data as the first message, step 308, then the disconnect state maintenance process 140-2 knows instantly that the received sequence number is the lowest sequence number.

To prompt receiving of a second (or third, or subsequent) message, the disconnect state maintenance process 140-2 may prior to receiving the second (or subsequent) message, fail to respond to the received first message with an acknowledgement message, step 307. Such an action should guarantee that a second (or subsequent) message is transmitted and then received by the disconnect state maintenance process 140-2.

After determining the lowest received sequence number, the disconnect state maintenance process 140-2 transmits a disconnect acknowledgement message, step 303. The disconnect acknowledgement message includes a receive window of zero. The disconnect acknowledgement message also includes a sequence number of one less than the lowest received sequence number, the lowest received sequence number determined as described above. Finally, the disconnect state maintenance process 140-2 continues to transmit the disconnect acknowledge message with a receive window of zero and a sequence number of one less than the lowest received sequence number until the transport protocol connection exits the disconnect state to a connect state, step 304.

Figure 4A:
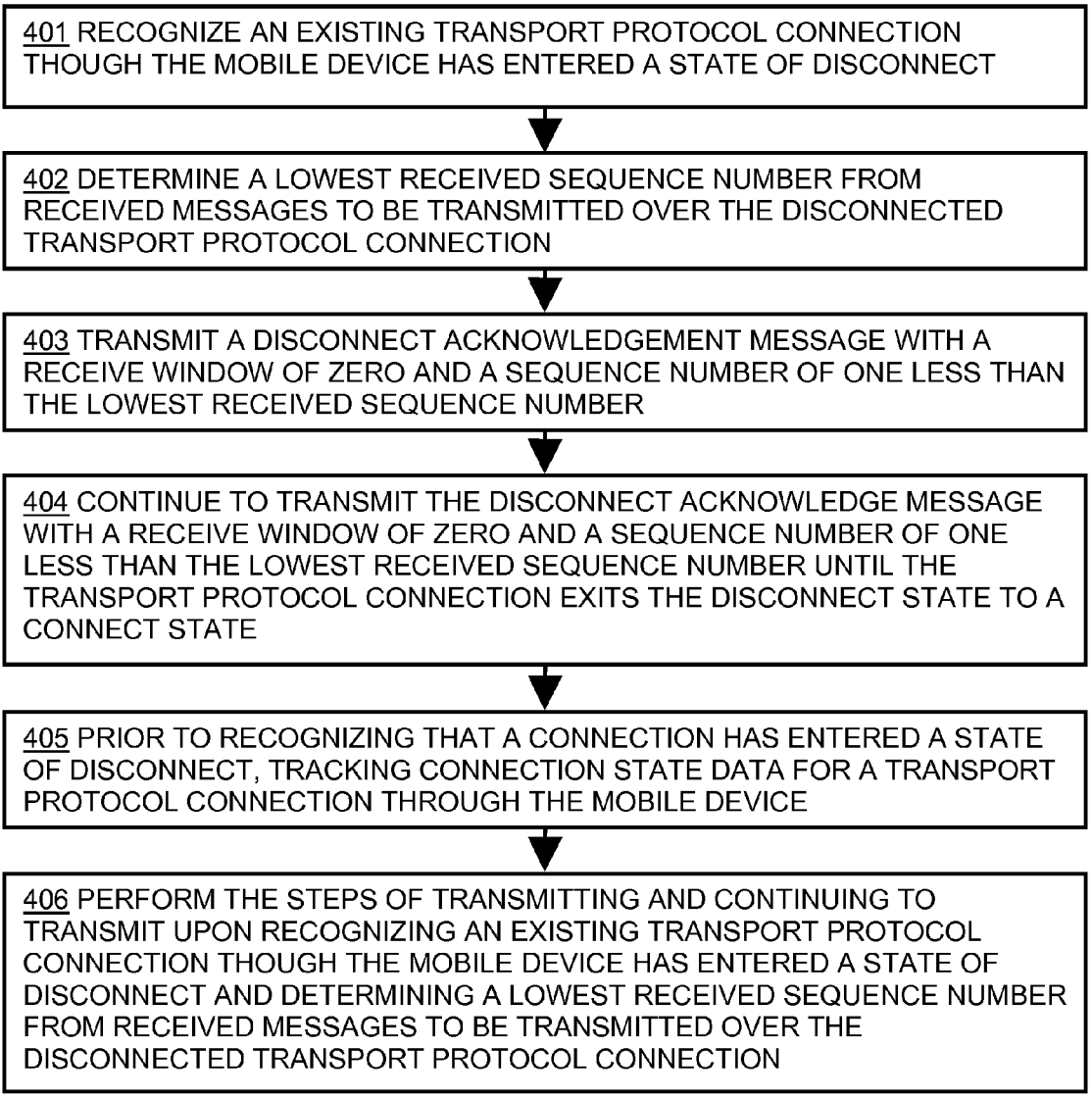

In FIGS. 4A-4B, the disconnect state maintenance process 140-2 incorporates the use of tracking transport protocol state connection data. In FIG. 4A, prior to recognizing that a connection has entered a state of disconnect, the disconnect state maintenance process 140-2 tracks connection state data for a transport protocol connection through the mobile device, step 405. By doing this prior to any disconnect state, the disconnect state maintenance process 140-2 is able to have any connection state data in advance of a disconnect. Thus, when the disconnect state maintenance process 140-2 recognizes that an existing transport protocol connection though the mobile device has entered a state of disconnect, step 401, the disconnect state maintenance process 140-2 determines a lowest received sequence number from received messages to be transmitted over the disconnected transport protocol connection, step 402, by simply reviewing the current tracked connection state data, which should include the lowest received sequence number.

Upon recognizing an existing transport protocol connection though the mobile device has entered a state of disconnect and determining a lowest received sequence number from received messages to be transmitted over the disconnected transport protocol connection, the disconnect state maintenance process 140-2 performs the steps of transmitting and continuing to transmit, step 406. That is, the disconnect state maintenance process 140-2 transmits a disconnect acknowledgement message, step 403, the disconnect acknowledgement message including a receive window of zero and a sequence number of one less than the lowest received sequence number; and the disconnect state maintenance process 140-2 continues to transmit the disconnect acknowledge message with a receive window of zero and a sequence number of one less than the lowest received sequence number until the transport protocol connection exits the disconnect state to a connect state, step 404. These steps may be performed immediately because the disconnect state maintenance process 140-2 does not need to spend any time determining the lowest sequence number, such as waiting for a re-transmission of the same sequence number as described above in regards to FIG. 3. The disconnect state maintenance process 140-2 already has the lowest sequence number from the tracked connection state data.

In FIG. 4B, the disconnect state maintenance process 140-2 also tracks connection state data. The disconnect state maintenance process 140-2 first recognizes that an existing transport protocol connection though the mobile device has entered a state of disconnect, step 401. As stated above, the disconnect state maintenance process 140-2 may use any number of ways to perform this operation. The disconnect state maintenance process 140-2 then tracks a current lowest sequence number received in a series of messages to be transmitted over the connection, step 407. In some embodiments, prior to recognizing that a connection has entered a state of disconnect, the disconnect state maintenance process 140-2 tracks connection state data for a transport protocol connection through the mobile device, step 410, where the connection state data includes a sequence number and an identifier of each message to be transmitted over the connection.

The disconnect state maintenance process 140-2 next determines a lowest received sequence number from received messages to be transmitted over the disconnected transport protocol connection, step 402. As above, the disconnect state maintenance process 140-2 simply needs to look at the tracked data for the current lowest sequence number received. In some situations, this will be the sequence number of the last message transmitted, but other times, the current lowest sequence number received may be from a previous message if there were errors in transmitting messages.

After determining the lowest received sequence number, the disconnect state maintenance process 140-2 transmits a disconnect acknowledgement message, step 403. The disconnect acknowledgement message includes a receive window of zero. The disconnect acknowledgement message also includes a sequence number of one less than the current lowest sequence number received, step 408. Finally, the disconnect state maintenance process 140-2 continues to transmit the disconnect acknowledge message with a receive window of zero and a sequence number of one less than the lowest received sequence number until the transport protocol connection exits the disconnect state to a connect state, step 404. The sequence number in these disconnect acknowledgement messages may also be one less than the current lowest sequence number received, step 409.

Figure 5:
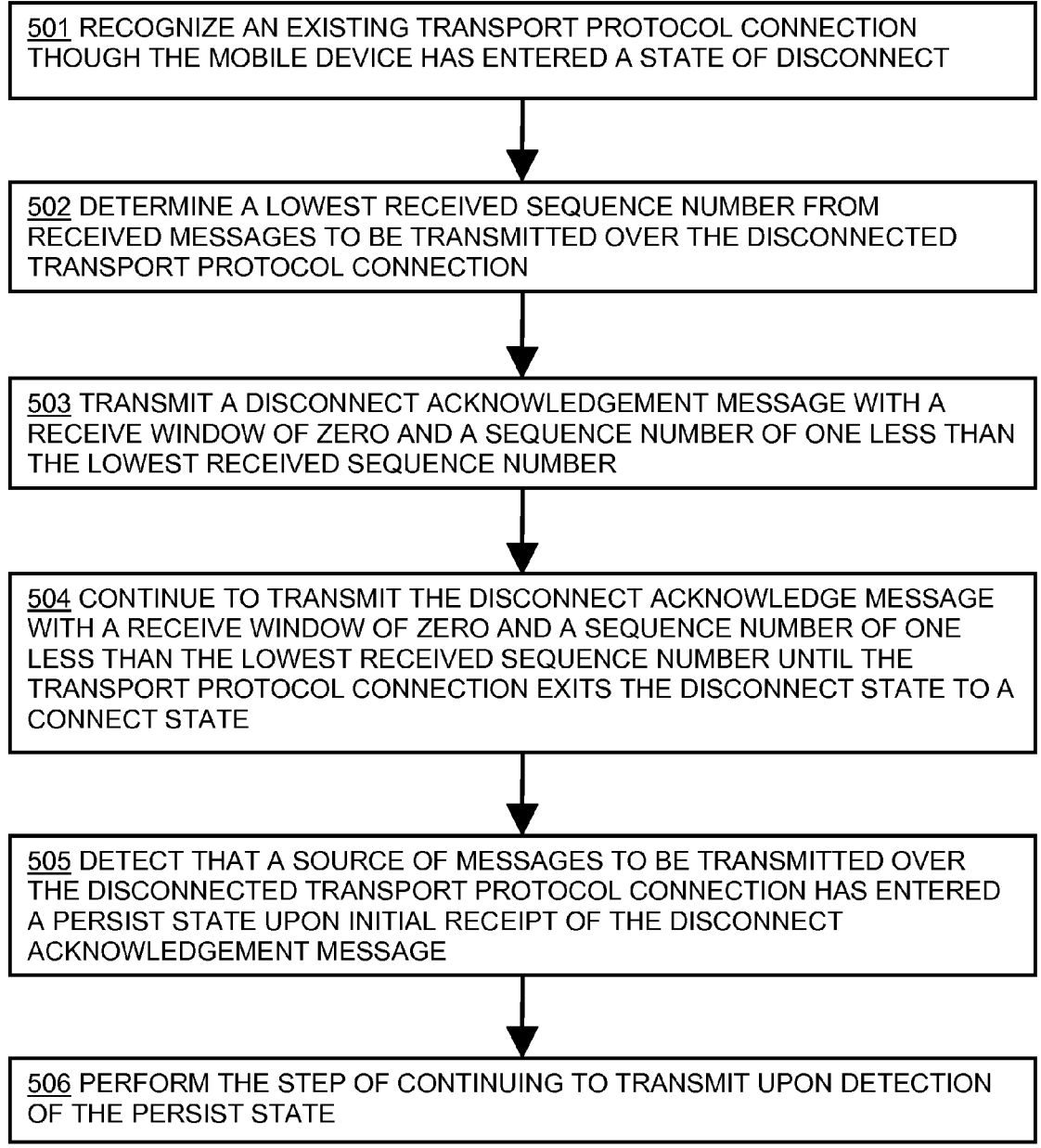
FIG. 5 illustrates a flowchart of a procedure preformed by the computer system depicted in FIG. 1 when the disconnection state maintenance process detects that a source of messages enters a persist state.

FIG. 5 illustrates the disconnect state maintenance process 140-2 making sure that a recipient of a disconnect acknowledgement message is in a persist state or mode before transmitting second and subsequent disconnect acknowledgement messages. First, as described above, the disconnect state maintenance process 140-2 recognizes that an existing transport protocol connection though the mobile device has entered a state of disconnect, step 501. The disconnect state maintenance process 140-2 next determines a lowest received sequence number from received messages to be transmitted over the disconnected transport protocol connection, step 502. The disconnect state maintenance process 140-2 may wait for a re-transmitted message, as describe in regards to FIG. 3, or may track connection state data, as described in regards to FIGS. 4A-4B, to determine the lowest received sequence number.

Next, having determined the lowest received sequence number, the disconnect state maintenance process 140-2 transmits a disconnect acknowledgement message, step 503. The disconnect acknowledgement message includes a sequence number of one less than the lowest received sequence number and a receive window of zero. The disconnect state maintenance process 140-2 then detects that a source of messages to be transmitted over the disconnected transport protocol connection has entered a persist state upon initial receipt of the disconnect acknowledgement message, step 505. In other words, the disconnect state maintenance process 140-2 makes sure that the recipient of the disconnect acknowledgement message has actually entered a persist state. The disconnect state maintenance process 140-2 may perform this operation in a variety of ways. For example, the disconnect state maintenance process 140-2 may simply wait to receive a probe message or other similar message from the recipient of the disconnect acknowledgement message. A probe message (or other similar message) should be sent by the recipient of the disconnect acknowledgement message in response to receiving an acknowledgement message with a receive window of zero. If the disconnect state maintenance process 140-2 receives a probe message, the disconnect state maintenance process 140-2 knows that the recipient is in a persist state. Alternatively, the disconnect state maintenance process 140-2 may employ a timer to wait a particular amount of time to receive a probing message (or similar message). In this situation, if the timer expires, the disconnect state maintenance process 140-2 may re-transmit the original disconnect acknowledgement message. The disconnect state maintenance process 140-2 may be programmed so that repeating this action a number of times without ever receiving a probing (or similar) message causes the disconnect state maintenance process 140-2 to cease operation. This may indicate that there is a problem with the connection between the computer system 110 and the intended recipient of the disconnect acknowledgement message, or a problem with the intended recipient itself. Alternatively, the disconnect state maintenance process 140-2 may be signaled that there is an error with the computer system 110, such as a problem with the network interface 115. The disconnect state maintenance process 140-2 may then employ any variety of techniques to deal with such issues.

Finally, having detected that the recipient did enter a persist state, the disconnect state maintenance process 140-2 performing the step of continuing to transmit upon detection of the persist state, step 506. That is, the disconnect state maintenance process 140-2 continues to transmit the disconnect acknowledge message with a receive window of zero and a sequence number of one less than the lowest received sequence number until the transport protocol connection exits the disconnect state to a connect state, step 504.

Figure 6:
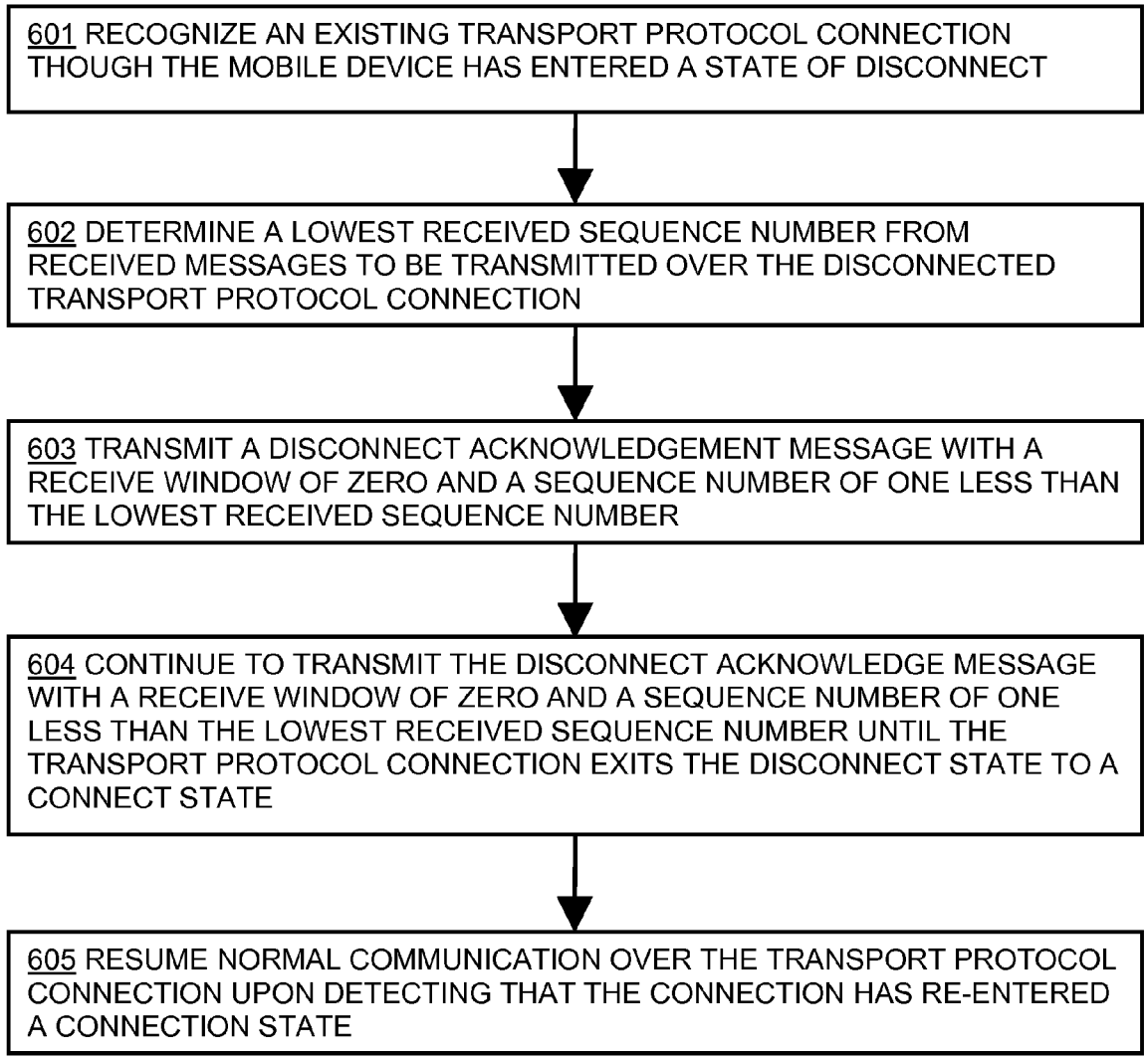
FIG. 6 illustrates a flowchart of a procedure preformed by the computer system depicted in FIG. 1 when the disconnection state maintenance process detects that the connection is no longer in a state of disconnect.

In FIG. 6, the disconnect state maintenance process 140-2 recognizes that the transport protocol connection has exited the disconnect state and re-entered a connect state, and so resumes normal communication over the transport protocol connection. The disconnect state maintenance process 140-2 first recognizes that an existing transport protocol connection though the mobile device has entered a state of disconnect, step 601. As stated above, the disconnect state maintenance process 140-2 may use any number of ways to perform this operation. The disconnect state maintenance process 140-2 next determines a lowest received sequence number from received messages to be transmitted over the disconnected transport protocol connection, step 602, by performing any of the processes described above.

After determining the lowest received sequence number, the disconnect state maintenance process 140-2 transmits a disconnect acknowledgement message, step 603. The disconnect acknowledgement message includes a receive window of zero and also includes a sequence number of one less than the lowest received sequence number. Then, the disconnect state maintenance process 140-2 continues to transmit the disconnect acknowledge message with a receive window of zero and a sequence number of one less than the lowest received sequence number until the transport protocol connection exits the disconnect state to a connect state, step 604. As stated above, this forces a recipient of the disconnect acknowledgement message into a persist state and causes the recipient to continue to try to re-transmit the appropriate next message in sequence. Finally, the disconnect state maintenance process 140-2 resumes normal communication over the transport protocol connection upon detecting that the connection has re-entered a connection state, step 605.

The disconnect state maintenance process 140-2 may detect that the transport protocol connection has re-entered a connection state using any of the processes described above. For example, if the disconnect state maintenance process 140-2 is executing on a computer system 110 that is a mobile device, and a user of the mobile device moves the device out of range of a mobile router connected to the device via a transport protocol connection, a disconnect state ensues, and the disconnect state maintenance process 140-2 performs as described above. The moment the user moves that device back into range of the mobile router, the connection is re-established, and normal communication resumes. A new connection needs to be made as the disconnect state maintenance process 140-2 has maintained the appropriate connection state data for the connection through the time of the disconnect. Further, note that should the receive window already be zero at the time of the disconnect (a rare but still possible occurrence), those steps of embodiments that result in setting the receive window to zero may not be necessary.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
   recognizing a transport protocol connection through a mobile device has entered a state of disconnect;
   determining a lowest received sequence number from received messages to be transmitted over the transport protocol connection;
   transmitting a disconnect acknowledgement message with a receive window of zero and a sequence number of one less than the lowest received sequence number; and
   continuing to transmit the disconnect acknowledge message with a receive window of zero and a sequence number of one less than the lowest received sequence number until the transport protocol connection exits the state of disconnect to a connect state.

2. The method of claim 1 wherein determining comprises:
receiving a first message to be transmitted over the existing connection, the first message including a received sequence number; and
receiving a second message to be transmitted over the connection, the second message including the same received sequence number, the received sequence number being the lowest received sequence number.

3. The method of claim 1 comprising:
prior to recognizing that a connection has entered a state of disconnect, tracking connection state data for a transport protocol connection through the mobile device.

4. The method of claim 3 comprising:
performing the steps of transmitting and continuing to transmit upon recognizing the transport protocol connection through the mobile device has entered the state of disconnect and determining the lowest received sequence number from received messages to be transmitted over the transport protocol connection.

5. The method of claim 4 comprising:
tracking a current lowest sequence number received in a series of messages to be transmitted over the connection;
wherein transmitting comprises:
transmitting a disconnect acknowledgement message with a receive window of zero and a sequence number of one less than the current lowest sequence number received;
and wherein continuing to transmit comprises:
continuing to transmit the disconnect acknowledge message with a receive window of zero and a sequence number of one less than the current lowest sequence number received until the transport protocol connection exits the disconnect state to a connect state.

6. The method of claim 3 wherein tracking comprises:
prior to recognizing that a connection has entered a state of disconnect, tracking connection state data for a transport protocol connection through the mobile device, connection state data including a sequence number and an identifier of each message to be transmitted over the connection.

7. The method of claim 2 comprising:
prior to receiving the second message, failing to respond to the received first message with an acknowledgement message.

8. The method of claim 2 wherein receiving a second message comprises:
receiving a second message to be transmitted over the connection, the second message being equivalent to the first message, such that the second message includes the same received sequence number and the same data as the first message.

9. The method of claim 1 comprising:
detecting that a source of messages to be transmitted over the disconnected transport protocol connection has entered a persist state upon initial receipt of the disconnect acknowledgement message; and
performing the step of continuing to transmit upon detection of the persist state.

10. The method of claim 1 comprising:
resuming normal communication over the transport protocol connection upon detecting that the connection has re-entered a connection state.

11. A system comprising:
a network interface operable to connect with mobile devices;
a memory operable to store instructions and data, the memory in communication with the network interface;
and an execution unit coupled to the memory, the execution unit in communication with the network interface and data stored in the memory, and responsive to instructions stored in the memory;
wherein the memory is encoded with a disconnect state maintenance application, that when executed in the execution unit, provides a disconnect state maintenance process that maintains transport protocol connection state data in a mobile device by performing operations of:
recognizing a transport protocol connection through the mobile device has entered a state of disconnect;
determining a lowest received sequence number from received messages to be transmitted over the transport protocol connection;
transmitting a disconnect acknowledgement message with a receive window of zero and a sequence number of one less than the lowest received sequence number; and
continuing to transmit the disconnect acknowledge message with a receive window of zero and a sequence number of one less than the lowest received sequence number until the transport protocol connection exits the state of disconnect to a connect state.

12. The system of claim 11 wherein determining comprises:
receiving a first message to be transmitted over the existing connection, the first message including a received sequence number; and
receiving a second message to be transmitted over the connection, the second message including the same received sequence number, the received sequence number being the lowest received sequence number.

13. The system of claim 11 comprising:
prior to recognizing that a connection has entered a state of disconnect, tracking connection state data for a transport protocol connection through the mobile device.

14. The system of claim 13 comprising:
tracking a current lowest sequence number received in a series of messages to be transmitted over the connection;
wherein transmitting comprises:
transmitting a disconnect acknowledgement message with a receive window of zero and a sequence number of one less than the current lowest sequence number received;
and wherein continuing to transmit comprises:
continuing to transmit the disconnect acknowledge message with a receive window of zero and a sequence number of one less than the current lowest sequence number received until the transport protocol connection exits the disconnect state to a connect state.

15. The system of claim 11 comprising:
detecting that a source of messages to be transmitted over the disconnected transport protocol connection has entered a persist state upon initial receipt of the disconnect acknowledgement message; and
performing the step of continuing to transmit upon detection of the persist state.

16. Logic encoded in one or more tangible computer-readable storage media for execution, the logic executable with a processor, and when executed, causes the processor to perform steps of:
recognizing a transport protocol connection through the mobile device has entered a state of disconnect;
determining a lowest received sequence number from received messages to be transmitted over the transport protocol connection;

transmitting a disconnect acknowledgement message with a receive window of zero and a sequence number of one less than the lowest received sequence number; and continuing to transmit the disconnect acknowledge message with a receive window of zero and a sequence number of one less than the lowest received sequence number until the transport protocol connection exits the state of disconnect to a connect state.

17. The logic of claim 16 wherein determining comprises:

receiving a first message to be transmitted over the existing connection, the first message including a received sequence number; and for receiving a second message to be transmitted over the connection, the second message including the same received sequence number, the received sequence number being the lowest received sequence number.

18. The logic of claim 16, the steps further comprising:

prior to recognizing that a connection has entered a state of disconnect, tracking connection state data for a transport protocol connection through the mobile device.

19. The logic of claim 18, wherein the steps further comprise:

tracking a current lowest sequence number received in a series of messages to be transmitted over the connection;

wherein transmitting comprises:

transmitting a disconnect acknowledgement message with a receive window of zero and a sequence number of one less than the current lowest sequence number received;

and wherein continuing to transmit comprises:

continuing to transmit the disconnect acknowledge message with a receive window of zero and a sequence number of one less than the current lowest sequence number received until the transport protocol connection exits the disconnect state to a connect state.

20. The logic of claim 16, wherein the steps further comprise:

detecting that a source of messages to be transmitted over the disconnected transport protocol connection has entered a persist state upon initial receipt of the disconnect acknowledgement message; and wherein continuing to transmit the disconnect acknowledge message is in response to detection of the persist state.

* * * * *